(12) United States Patent
Fassnacht

(10) Patent No.: US 7,548,042 B2
(45) Date of Patent: Jun. 16, 2009

(54) DC-DC CONVERTER DEVICE AND METHOD FOR OPERATING THE DC-DC CONVERTER OF A MOTOR VEHICLE ON-BOARD ELECTRICAL SYSTEM

(75) Inventor: Jochen Fassnacht, Schramberg (DE)

(73) Assignee: Robert Bosch GmbH, Stuttgart (DE)

( * ) Notice: Subject to any disclaimer, the term of this patent is extended or adjusted under 35 U.S.C. 154(b) by 385 days.

(21) Appl. No.: 11/409,285

(22) Filed: Apr. 21, 2006

(65) Prior Publication Data

US 2006/0279263 A1 Dec. 14, 2006

(30) Foreign Application Priority Data

May 20, 2005 (DE) .................. 10 2005 023 360

(51) Int. Cl.
*G05F 1/40* (2006.01)
*B60L 1/00* (2006.01)

(52) U.S. Cl. ..................... 323/265; 307/10.1

(58) Field of Classification Search ........... 323/222, 323/223, 225, 226, 265, 268, 270, 273, 275; 191/2–4; 307/9.1, 10.1, 10.6
See application file for complete search history.

(56) References Cited

U.S. PATENT DOCUMENTS

| 4,890,073 | A  | * | 12/1989 | Flachenecker et al. | ......... 331/55 |
| 6,487,094 | B1 | * | 11/2002 | Weng et al. | ............... 363/21.12 |
| 7,015,678 | B2 | * | 3/2006 | Plankensteiner | ............ 323/222 |

* cited by examiner

*Primary Examiner*—Matthew V Nguyen
(74) *Attorney, Agent, or Firm*—Kenyon & Kenyon LLP

(57) ABSTRACT

A DC-DC converter system having a DC-DC converter including a power transistor and a control unit is provided, which control unit provides control signals for triggering the power transistor. The DC-DC converter is operable in two operating modes: in a first operating mode, the DC-DC converter operates at high efficiency; and in a second operating mode, the DC-DC converter operates at low efficiency. The high power loss released in the second operating mode is used in the warm-up phase after the start of a motor vehicle engine as an additional heating system.

20 Claims, 1 Drawing Sheet

DC-DC CONVERTER DEVICE AND METHOD FOR OPERATING THE DC-DC CONVERTER OF A MOTOR VEHICLE ON-BOARD ELECTRICAL SYSTEM

FIELD OF THE INVENTION

The present invention relates to a DC-DC converter device and a method for operating the DC-DC converter of a motor vehicle on-board electrical system.

BACKGROUND INFORMATION

The use of dual-voltage vehicle electrical systems in which a first on-board electrical subsystem provides a 42-V voltage for supplying 42-V consumers and a second on-board electrical subsystem provides a 14-V voltage for supplying 14-V consumers is known in the automotive industry. A DC-DC converter which is used, for example, for transforming the 42-V voltage into the 14-V voltage as a step-down transformer is provided between the two on-board electrical subsystems. Such a DC-DC converter has one or more power transistors which are triggered by a control unit as desired.

Furthermore, bringing the engine of a motor vehicle to its operating temperature as quickly as possible by using an additional electric heater after starting the vehicle is known, since internal combustion engines have a considerably higher efficiency and lower emissions at their operating temperature than in the cold state immediately after starting the vehicle.

This additional electric heater is used for heating the cooling water of the motor vehicle. For this purpose, a heating resistor supplied by a generator and provided for the purpose of heating the cooling water may be used.

SUMMARY OF THE INVENTION

A DC-DC converter device and a method for operating the DC-DC converter of a motor-vehicle electrical system according to the present invention provide the advantage that an additional, separate heating element provided for heating the cooling water of the engine is dispensed with, as well as the accompanying circuit hardware for the separate heating element. The present invention utilizes the control of the power transistor of the DC-DC converter of the vehicle's on-board electrical system (which power transistor is a standard component present in the converter) to implement the heating of the cooling water of the engine at any time using the desired heating power. Another advantage of the present invention is that, due to the thermal coupling of the DC-DC converter to the cooling water circuit as provided by the present invention, sufficient cooling of the DC-DC converter itself is also automatically achieved.

The above-named advantages result from the fact that the power transistor of the DC-DC converter is triggered during those time periods when additional heating of the cooling water is desired in such a way that the DC-DC converter intentionally operates at a low efficiency in order to heat the cooling water using the power losses generated.

The time periods in which additional heating of the cooling water is desired include the warm-up phase immediately following the start of the vehicle. The time periods for additional heating, however, may be any other time periods which may also depend on the external temperature, for example. In particular, in modern diesel vehicles, at very low external temperatures the engine heat is often insufficient to heat the vehicle passenger compartment as desired. In such cases the desired temperature in the vehicle passenger compartment may be quickly reached using additional heating according to the present invention.

The power loss of the DC-DC converter and thus the additional heating power provided may be adjusted as needed by appropriately changing the switching frequency of the power transistor of the DC-DC converter. The power loss obtained increases with the switching frequency. If a particularly high additional heating power is needed, the power transistor of the DC-DC converter is operated in linear operation, since they have the highest power losses-in this linear operation.

DETAILED DESCRIPTION

Figure 1:
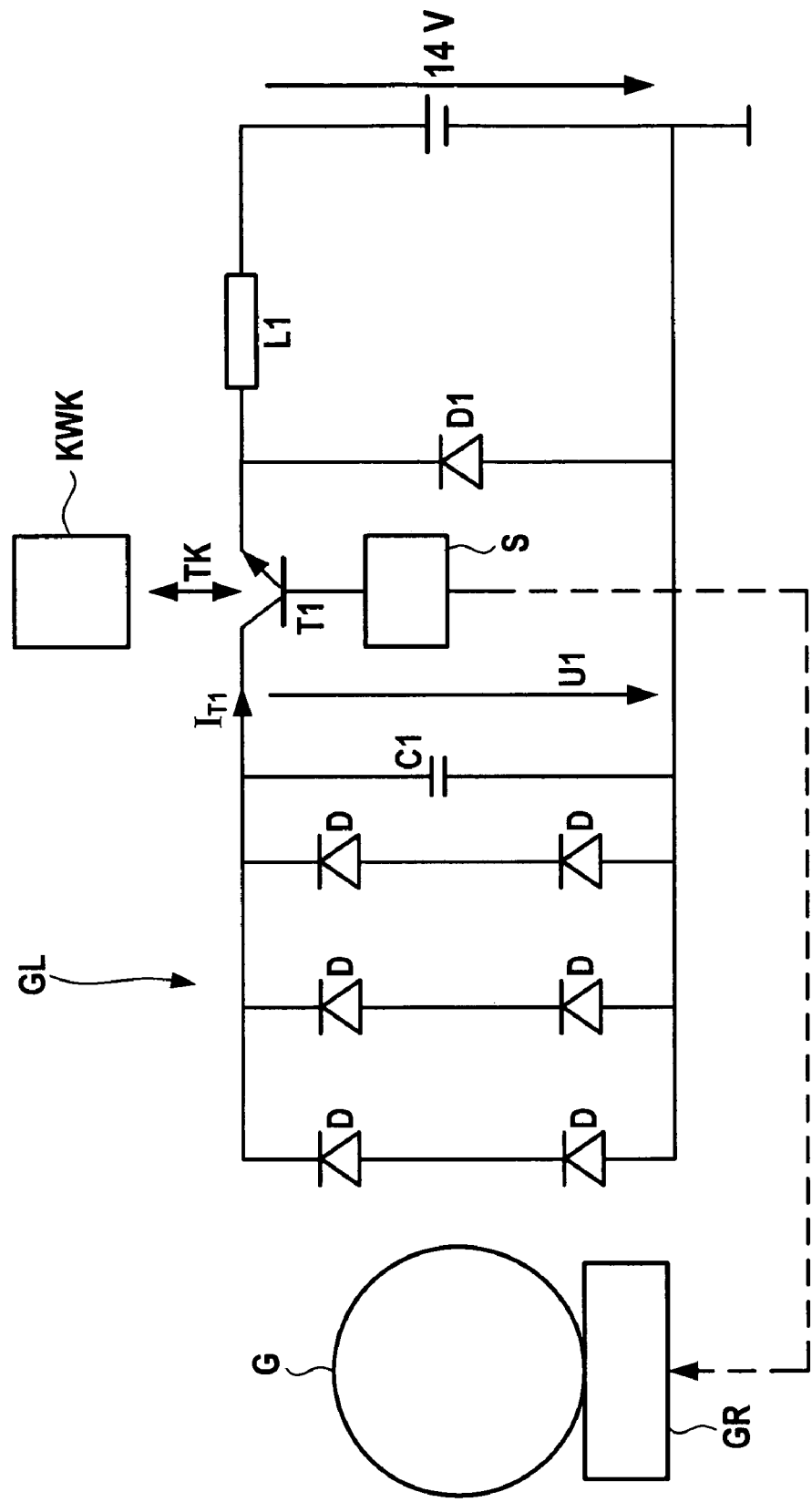
FIG. 1 shows a schematic circuit diagram of a DC-DC converter system according to the present invention.

The DC-DC converter depicted in FIG. 1, which is a component of the on-board electric system of a motor vehicle, has a generator G having an associated generator controller GR and a rectifier GL. The rectifier includes a parallel circuit of three branches, a series circuit of two diodes D being provided in each of these branches. A capacitor C1, across which there is a voltage drop U1, is connected in parallel with the rectifier. This voltage U1 corresponds to the generator voltage.

The upper terminal of capacitor C1 is connected to a terminal of a power transistor T1, which may be a field-effect transistor. The control input of this power transistor T1 is connected to a control unit S, which provides control signals for power transistor T1, on the basis of which power transistor T1 blocks or conducts. A third terminal of power transistor T1 is connected to a first terminal of a coil L1, whose second terminal is connected to the positive pole of a vehicle battery.

The cathode of another diode D1, whose anode is connected to the negative pole of the battery and to ground, is connected to the third terminal of power transistor T1 and the first terminal of coil L1.

Transistor T1, together with diode D1 and coil L1, forms a DC-DC converter, which in the exemplary embodiment shown operates as a step-down transformer.

According to the present invention, the DC-DC converter is operable in two different operating modes.

In its first operating mode, which is activated in normal operation of the vehicle, in which the engine is at its operating temperature, the DC-DC converter is operated in such a way that it has the least possible power loss, i.e., operates at high efficiency. In this first operating mode the DC-DC converter is in switching operating mode in the sense that power transistor T1 is always totally conductive or totally blocked, since in these cases either the current or the voltage, and thus the power loss, is low. In this operating mode, which corresponds to the only (and desirable) operating mode in the conventional DC-DC converters, the power transistor goes through the linear range when power transistor T1 is switched off or on; however, in order to reduce the power loss, it is made sure that power transistor T1 is switched on and off as quickly as possible and as infrequently as possible.

In a second operating mode of the DC-DC converter of the present invention, which is activated after the start of the engine, e.g., in the warm-up phase, the DC-DC converter is operated in such a way that it has the highest possible power loss, i.e., the converter operates at low efficiency. In this second operating mode, the DC-DC converter is operated in such a way that power transistor T1 operates in linear operation and is activated with a considerably higher switching frequency compared to normal operation. The resulting high power loss is used, according to the present invention, for heating the cooling water. To make this possible, the DC-DC converter, according to the present invention, has a thermal coupling TK to cooling water circuit KWK.

For the maximum heat loss available for heating the cooling water and achieved in linear operation, the following formula applies:

$$P_{Vmax} = (U1 - 14V) \cdot I_{T1},$$

where U1 is the voltage drop across capacitor C1 and $I_{T1}$ is the current flowing through transistor T1. In linear operation, heat loss $P_{Vmax}$ may be reduced by reducing the current flowing through transistor T1. This may be accomplished by regulating the generator voltage by modifying the generator field. For this purpose, control unit S supplies appropriate control signals to generator controller GR via the line which is shown as a dashed line in FIG. 1. Alternatively to a reduction of the current flowing through transistor T1, the voltage drop across transistor T1 may also be reduced.

Variation of the power loss when the system is on is possible by varying the switching frequency of transistor T1. The resulting power loss increases with the switching frequency. The essential advantage of such a switching frequency modulation is that the power loss and the power to be transmitted may be adjusted without having to regulate the generator voltage.

According to an example embodiment of the present invention, the DC-DC converter has a plurality of power transistors connected in parallel, which are triggered in the second operating mode in such a way that the DC-DC converter operates at low efficiency and releases an increased power loss. This has several advantages. First, system availability is increased and emergency operation characteristics are ensured. In the event of failure of a transistor, the voltage must be limited via the field control of generator G, for example, to 14 V. In the event of an interruption, the transistor connected in parallel must guarantee the emergency operation characteristics using a reduced total current. Another advantage of the presence of a plurality of power transistors is that in the second operating mode the resulting power loss is further increased, so that an increased power loss is available for heating the cooling water.

The device depicted in FIG. 1 operates as follows:

In a first step, the engine of a motor vehicle is started by operating the starter. After this engine start, control unit S activates the second operating mode of the DC-DC converter by triggering power transistor T1 in an appropriate manner in which the DC-DC converter operates at low efficiency, as described previously. The resulting power loss is used for heating the cooling water, i.e., in the sense of an additional heating system. The second operating mode is sustained during this warm-up phase of the vehicle until the engine reaches its operating temperature. After the engine has reached its operating temperature, control unit S activates the first operating mode of the DC-DC converter by triggering power transistor T1 in an appropriate manner in which the DC-DC converter operates at high efficiency.

At normal and high external temperatures, the heat generated by the engine, which is provided by the vehicle engine running at its operating temperature, is sufficient for also heating the passenger compartment, if necessary.

At low external temperatures, in particular in the case of the more recent diesel vehicles, it may happen that the heat released by the engine is no longer sufficient for keeping the passenger compartment of the vehicle at a desired temperature. In this case, control unit S brings the DC-DC converter into its second operating mode for as long as it takes to reach the desired temperature in the passenger compartment.

In summary, the present invention provides a DC-DC converter which has two operating modes. In one of these operating modes, the converter operates at high efficiency and releases little power loss. In the other operating mode, the converter operates at low efficiency and releases a high power loss. This high power loss of the DC-DC converter is used in particular during the warm-up period of the vehicle for heating the cooling water in the sense of an additional heating system. Alternatively, the DC-DC converter may also be used as an additional heating system of a different type or as an additional heating system for other heat-dependent components or systems of the motor vehicle.

What is claimed is:

1. A DC-DC converter device, comprising:
   at least one power transistor; and
   a control unit which provides control signals for triggering the power transistor;
   wherein:
      the DC-DC converter device has:
         a first operating mode in which the DC-DC converter device operates at high efficiency, and a second operating mode in which the DC-DC converter device operates at low efficiency so that the converter device generates a high power loss in the second operating mode; and
         a thermal coupling to one of:
            a) a cooling water heating circuit of a motor vehicle;
            b) a passenger compartment heating circuit of a motor vehicle; and
            c) a separate heating system of a motor vehicle; and
         the DC-DC converter is used in the second operating mode as an additional electric heating element.

2. The DC-DC converter device as recited in claim 1, wherein the second operating mode is activated after a start of the motor vehicle in a warm-up phase of an engine of the motor vehicle.

3. The DC-DC converter device as recited in claim 1, wherein the second operating mode is activated as a function of the external temperature of the motor vehicle.

4. The DC-DC converter device as recited in claim 1, wherein the control unit provides control signals for triggering the power transistor in such a way that the power transistor is triggered in the first operating mode with a first switching frequency and triggered in the second operating mode with a second switching frequency, the second switching frequency being higher than the first switching frequency.

5. The DC-DC converter device as recited in claim 4, wherein the second switching frequency is variable.

6. The DC-DC converter device as recited in claim 1, wherein the power transistor operates in linear operation in the second operating mode.

7. The DC-DC converter device as recited in claim 6, wherein the DC-DC converter device is operatively coupled to a generator having a generator controller, and wherein the control unit provides the generator controller with control signals in linear operation to regulate the generator voltage to reduce one of: a) a current flowing through the power transistor; and b) a voltage drop across the power transistor.

8. The DC-DC converter device as recited in claim 4, wherein it has a plurality of power transistors.

9. The DC-DC converter device as recited in claim 1, wherein the DC-DC converter device is included in a vehicle on board electric system.

10. A method for operating a DC-DC converter device, comprising:

provide, by a control unit, control signals for triggering at least one power transistor of the DC-DC converter device;

operating the DC-DC converter device, in a first operating mode of the DC-DC converter device, at high efficiency; and operating the DC-DC converter device, in a second operating mode of the DC-DC converter device, at low efficiency so that the DC-DC converter device generates a high power loss in the second operating mode;

wherein the DC-DC converter device:

has a thermal coupling to one of:
a) a cooling water heating circuit of a motor vehicle;
b) a passenger compartment heating circuit of a motor vehicle; and
c) a separate heating system of a motor vehicle; and is used in the second operating mode as an additional electric heating element.

11. The method as recited in claim 10, wherein the DC-DC converter device is:

operated at the low efficiency at least immediately after a start of an engine of the motor vehicle during a warm-up phase of the engine;

operated at the high efficiency when the engine has reached a normal operating temperature after the warm-up phase; and switched into low efficiency operation when heat released by the engine is insufficient for heating one of a passenger compartment of the motor vehicle and a heat-dependent component of the motor vehicle to a desired temperature.

12. The method as recited in claim 10, wherein the DC-DC converter device is included in a motor vehicle on-board electrical system.

13. The method as recited in claim 9, wherein the second operating mode is activated after a start of the motor vehicle in a warm-up phase of an engine of the motor vehicle.

14. The DC-DC converter device as recited in claim 9, wherein the DC-DC converter device is operatively coupled to a generator having a generator controller, and wherein the control unit provides the generator controller with control signals in linear operation to regulate the generator voltage to reduce one of: a) a current flowing through the power transistor; and b) a voltage drop across the power transistor.

15. The DC-DC converter device as recited in claim 14, wherein the power transistor operates in linear operation in the second operating mode.

16. The DC-DC converter device as recited in claim 9, wherein the second operating mode is activated as a function of the external temperature of the motor vehicle.

17. The DC-DC converter device as recited in claim 9, wherein the control unit provides control signals for triggering the power transistor in such a way that the power transistor is triggered in the first operating mode with a first switching frequency and triggered in the second operating mode with a second switching frequency, the second switching frequency being higher than the first switching frequency.

18. The DC-DC converter device as recited in claim 17, wherein the second switching frequency is variable.

19. The DC-DC converter device as recited in claim 17, wherein the DC-DC converter device has a plurality of power transistors.

20. The DC-DC converter device as recited in claim 8, wherein the second switching frequency is variable.

* * * * *